(12) United States Patent
Schwinn et al.

(10) Patent No.: US 8,140,830 B2
(45) Date of Patent: Mar. 20, 2012

(54) STRUCTURAL POWER REDUCTION IN MULTITHREADED PROCESSOR

(75) Inventors: Stephen Joseph Schwinn, Woodbury, MN (US); Matthew Ray Tubbs, Rochester, MN (US); Charles David Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 12/125,278

(22) Filed: May 22, 2008

(65) Prior Publication Data

US 2009/0293061 A1    Nov. 26, 2009

(51) Int. Cl.
*G06F 9/46* (2006.01)
*G06F 1/26* (2006.01)
(52) U.S. Cl. ........................ 712/214; 713/320
(58) Field of Classification Search .................. 712/214; 713/320

See application file for complete search history.

(56) References Cited

U.S. PATENT DOCUMENTS

| | | | | |
|---|---|---|---|---|
| 5,781,776 A * | 7/1998 | Johnston et al. | ............... | 717/130 |
| 6,065,110 A * | 5/2000 | Meltzer et al. | ................ | 712/217 |
| 2002/0166075 A1 * | 11/2002 | Agarwal et al. | ............... | 713/320 |
| 2003/0115242 A1 * | 6/2003 | Hayduk | ......................... | 709/103 |
| 2007/0300227 A1 * | 12/2007 | Mall et al. | ..................... | 718/102 |

* cited by examiner

*Primary Examiner* — Daniel Pan
(74) *Attorney, Agent, or Firm* — Wood, Herron & Evans LLP

(57) ABSTRACT

A circuit arrangement and method utilize a plurality of execution units having different power and performance characteristics and capabilities within a multithreaded processor core, and selectively route instructions having different performance requirements to different execution units based upon those performance requirements. As such, instructions that have high performance requirements, such as instructions associated with primary tasks or time sensitive tasks, can be routed to a higher performance execution unit to maximize performance when executing those instructions, while instructions that have low performance requirements, such as instructions associated with background tasks or non-time sensitive tasks, can be routed to a reduced power execution unit to reduce the power consumption (and associated heat generation) associated with executing those instructions.

24 Claims, 7 Drawing Sheets

STRUCTURAL POWER REDUCTION IN MULTITHREADED PROCESSOR

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector. The aforementioned techniques may also be combined, resulting in a multithreaded vector execution unit architecture that enables multiple threads to issue SIMD instructions to a vector execution unit to process "vectors" of data points at the same time. In addition, multiple execution units may be used to permit independent operations to be performed in parallel, further increasing overall performance.

The various techniques for improving execution unit performance, however, do not come without a cost. Parallelism adds complexity, often requiring a greater number of logic gates, which increases both the size and the power consumption of such execution units. Coupling these techniques with the general desire to increase performance through other techniques, such as increased switching frequency, the power consumption of complex, high performance execution units continues to increase, despite efforts to reduce such power consumption through process improvements. Excessive power consumption can present issues for portable or battery powered devices, but more typically, excessive power consumption presents issues for nearly all electronic circuits due to the generation of heat, which often requires elaborate cooling systems to ensure that a circuit does not overheat and fail.

Chip-wide control over power consumption is often used in electronic circuits such as those used in laptop computers or other portable devices, typically by throttling down the clock rate or frequency of the circuit to reduce power consumption and the generation of heat. In addition, power consumption may also be reduced in some instances by temporarily shutting down unused circuits on a chip. In all of these instances, however, throttling back the power consumption of the circuit usually results in lower performance in the chip. Furthermore, the circuit characteristics that define the overall power consumption of such circuits, e.g., cycle time, voltage, logic area, capacitance, etc., are most often designed to meet a maximum performance target.

It has been found, however, that not all tasks performed by electronic devices require maximum performance. For example, some modern multithreaded processors implement multithreading as well as multiple parallel execution units that are optimized for maximum performance, and permit multiple instructions to be handled per clock cycle in the parallel execution units. The software that runs on such processors, however, is often broken into multiple program tasks that can execute in parallel on the multiple hardware threads. Some of these tasks, however, do not require quick turnaround on high performance execution units since other more critical program tasks may play a much greater role in limiting overall performance. Many background tasks, for example, are not critical to overall performance, and could be completed at a later time without impacting overall system performance.

For background and other non-time sensitive tasks, execution of these tasks with a high performance execution unit is often overkill, and needlessly adds to the power consumption and heat generation of the processor.

SUMMARY OF THE INVENTION

The invention addresses these and other problems associated with the prior art by utilizing a plurality of execution units having different power and performance characteristics and capabilities within a multithreaded processor core, and selectively routing instructions having different performance requirements to different execution units based upon those performance requirements. As such, instructions that have high performance requirements, such as instructions associated with primary tasks or time sensitive tasks, can be routed to a higher performance execution unit to maximize performance when executing those instructions, while instructions that have low performance requirements, such as instructions associated with background tasks or non-time sensitive tasks, can be routed to a reduced power execution unit to reduce the power consumption (and associated heat generation) associated with executing those instructions.

In many embodiments consistent with the invention, the various execution units in a multithreaded processor core differ from one another based on performance and power consumption, but are otherwise functionally equivalent, such that all such execution units are capable of executing instructions from a particular instruction set interchangeably. The routing of instructions to different execution units in these embodiments is thus primarily based on performance and power consumption issues, rather than on different or specialized functionality between the execution units. Furthermore, by assigning only non-performance critical tasks to lower power/lower performance execution units, overall performance will typically not be degraded, since critical tasks that are more determinative of overall performance can still be assigned to a higher performance execution unit. Thus, in many embodiments, the reductions in power consumption and cooling requirements can be achieved without an appreciable decrease in performance.

Consistent with one aspect of the invention, a circuit arrangement includes a plurality of execution units and multithreaded routing logic coupled thereto. Each of the plurality of execution units is configured to execute instructions from among a common set of instruction formats defined in an instruction set, and the plurality of execution units includes a first execution unit having lower performance and lower power consumption relative to a second execution unit from among the plurality of execution units. The multithreaded routing logic is configured to route instructions from a plurality of hardware threads to the plurality of execution units for execution thereby, and in particular, is configured to route a first instruction to the first execution unit based upon a relatively lower performance requirement associated with the first instruction, and to route a second instruction to the second execution unit based upon a relatively higher performance requirement associated with the first instruction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
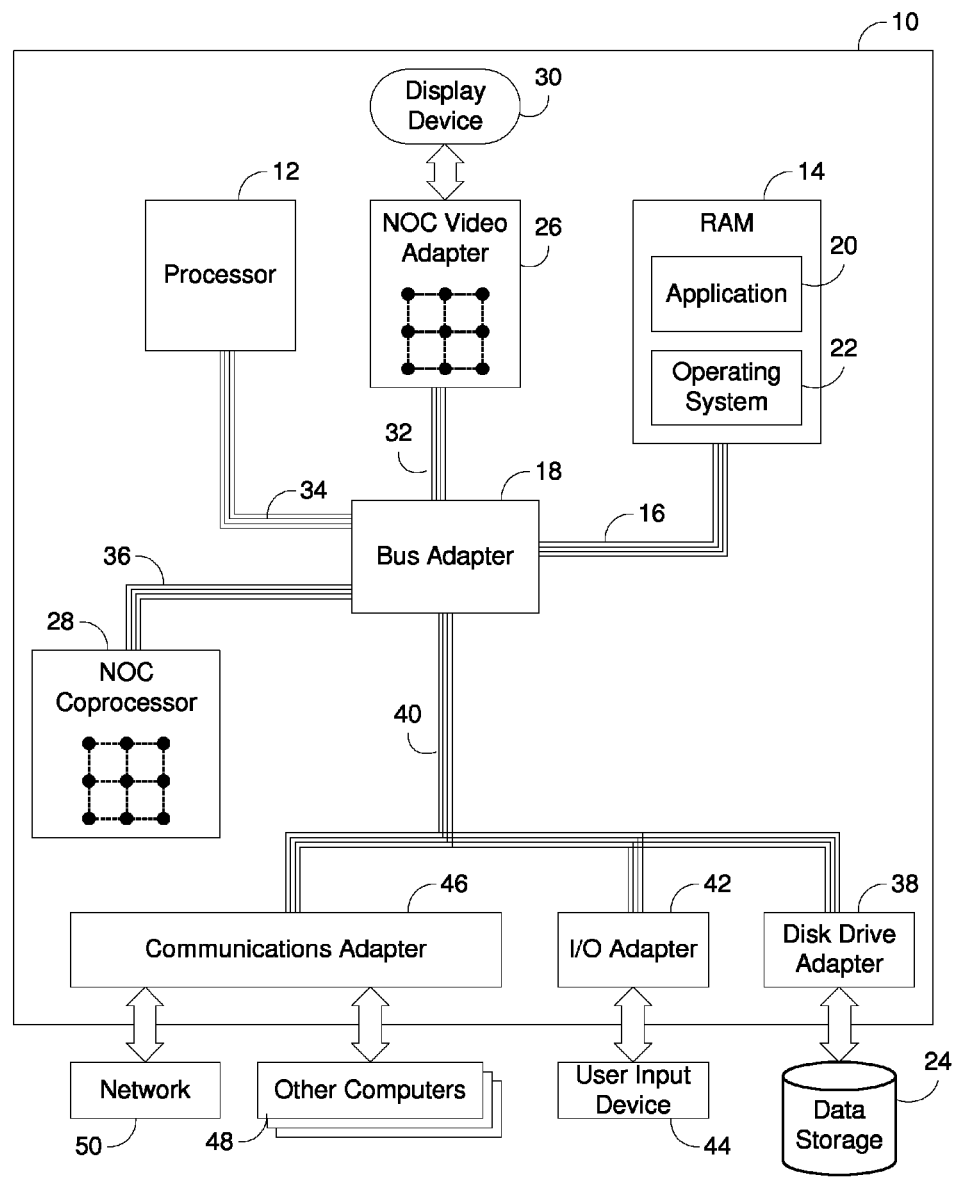
FIG. 1 is a block diagram of exemplary automated computing machinery including an exemplary computer useful in data processing consistent with embodiments of the present invention.

Embodiments consistent with the invention utilize a plurality of execution units having different power and performance characteristics and capabilities within a multithreaded processor core, and selectively route instructions having different performance requirements to different execution units based upon those performance requirements. In contrast with conventional designs that incorporate multiple execution units that are configured with the same performance characteristics, embodiments consistent with the invention include one or more execution units with relatively lower performance but also relatively lower power consumption. Such a reduced performance/reduced power execution unit can take advantage of various power reduction techniques such as reduced clock frequency or increased cycle time, lower operating voltage (e.g., within a voltage island), smaller circuit area, smaller gate size, smaller latch count, and/or less gate capacitance or other process variations to reduce power. A reduced performance/reduced power execution unit can also take advantage of other power reduction techniques related to how certain instructions are processed, e.g., by reducing the number of pipeline stages, omitting a pipeline altogether, reducing the complexity of the functional blocks that handle the instructions (e.g., using a 1-bit divide circuit instead of an 8-bit divide circuit), omitting specialized accelerator hardware circuits (e.g., omitting a dedicated multiplier circuit), etc.

In addition, in many embodiments, an application, operating system or kernel operating on a processor core may be aware of the performance requirements of various software tasks running on that core, thus enabling such tasks to be allocated to hardware threads, and thus allocated to different execution units, based on these known performance requirements. Thus, if a software task is not performance critical, it can be allocated to a hardware thread that uses a low power/performance execution unit, whereas if a software task is more performance critical, it can be allocated to a hardware thread that uses a high power/high performance execution unit. In many instances, overall performance will not degrade since critical tasks may still be allocated to hardware threads that utilize high performance execution units.

In the illustrated embodiments, a circuit arrangement, e.g., as may be implemented on an integrated circuit device, includes a plurality of execution units, where each of which is configured to execute instructions from among a common set of instruction formats defined in an instruction set. Put another way, the instruction set includes a set of instruction formats or types that are capable of being executed by each of the plurality of execution units. From a functional standpoint, the execution of an instruction having a format in that common set will generate the same result regardless of which execution unit actually executes that instruction. However, from a performance/power standpoint, the execution of such an instruction may vary from a performance and/or power consumption standpoint when executed by different execution units. Where an instruction is executed by a high performance/high power execution unit, execution of that instruction will typically be completed faster than if the instruction was executed by a low performance/low power execution unit. However, given that performance and power consumption generally track one another, execution of the instruction by the high performance/high power execution unit will typically consume more power, and generate more heat, than if the instruction was executed by the low performance/low power execution unit.

While in some embodiments the various execution units may support different instruction formats from one another such that only a subset of the instruction formats in the instruction set are capable of being interchangeably executed on each of the execution units, in other embodiments all of the execution units may be functionally equivalent to one another, so that each instruction format supported by one execution unit is equally supported by every other execution unit. In addition, it will be appreciated that a processor core may include other execution units that are completely separate from the set of execution units for which differing power/performance capabilities are defined. For example, in one embodiment a processor core may include a high power/high performance floating point execution unit and a low power/low performance floating point execution unit that share the handling of floating point operations, with a separate fixed point execution unit that handles all fixed point operations for the processor core.

A circuit arrangement consistent with the invention also typically includes multithreaded routing logic that is configured to route instructions from a plurality of hardware threads to the plurality of execution units for execution thereby. In many embodiments, the multithreaded routing logic is implemented within an instruction or issue unit in a processor core; however, other logic circuits capable of routing instructions associated with multiple hardware threads to different execution units may be used in the alternative.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
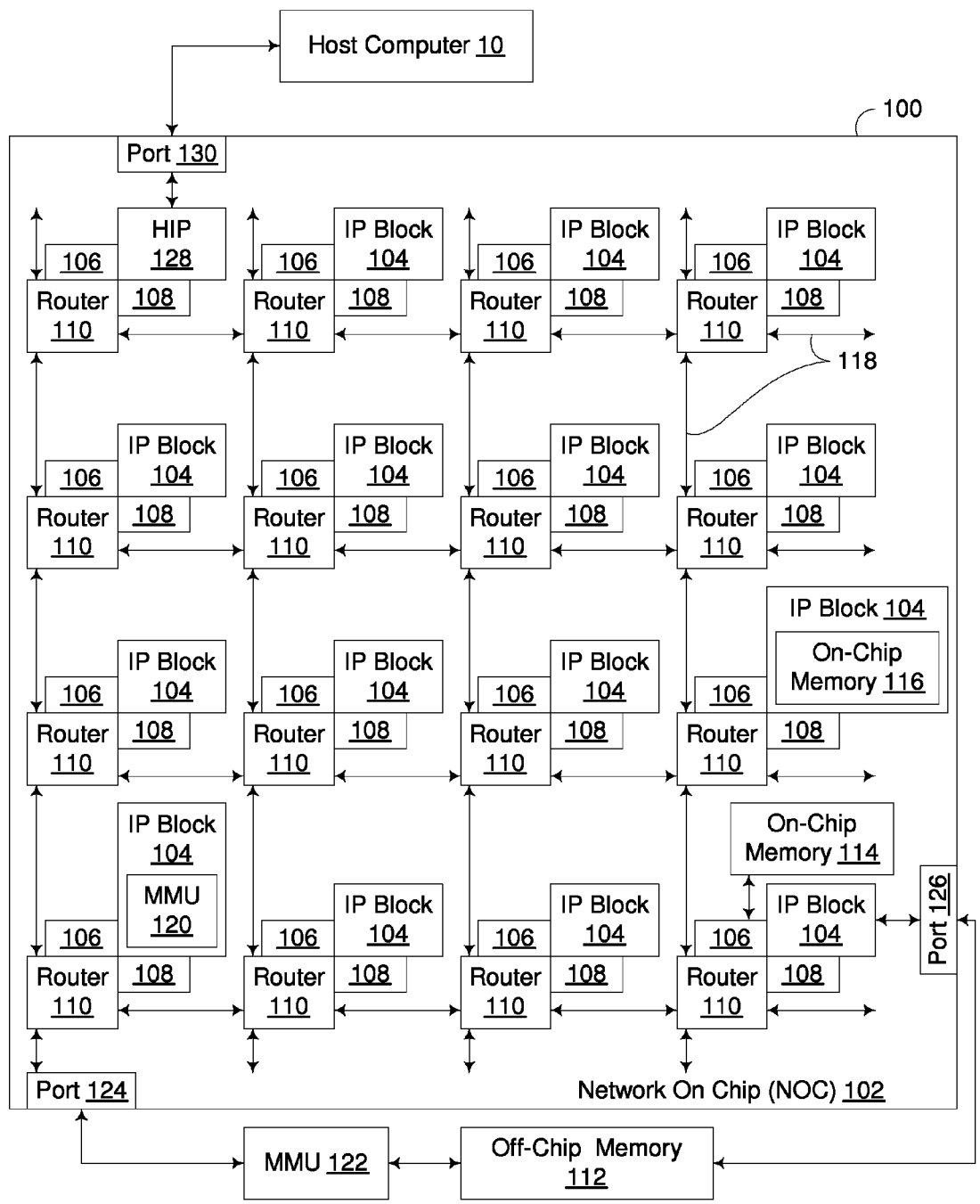
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
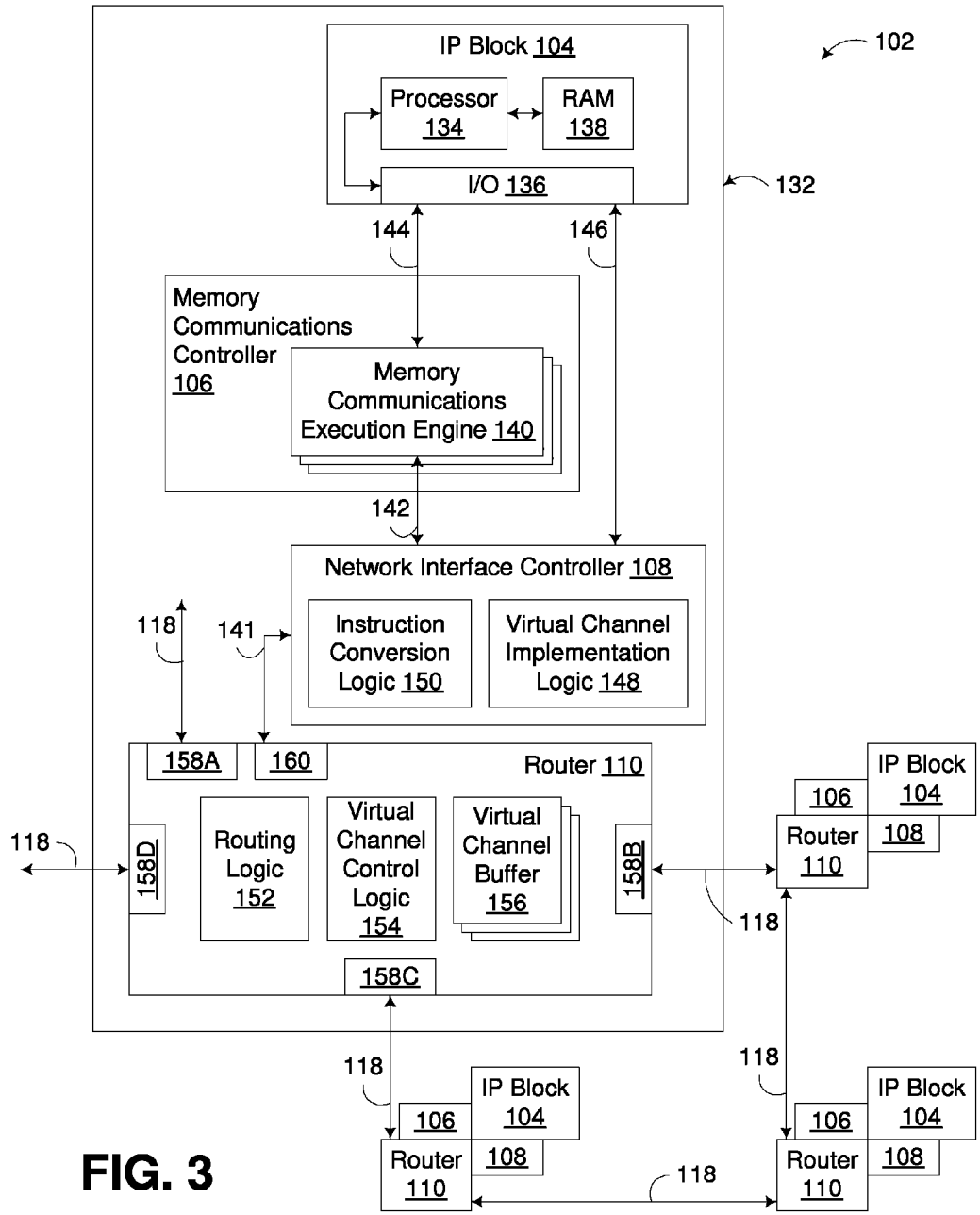
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
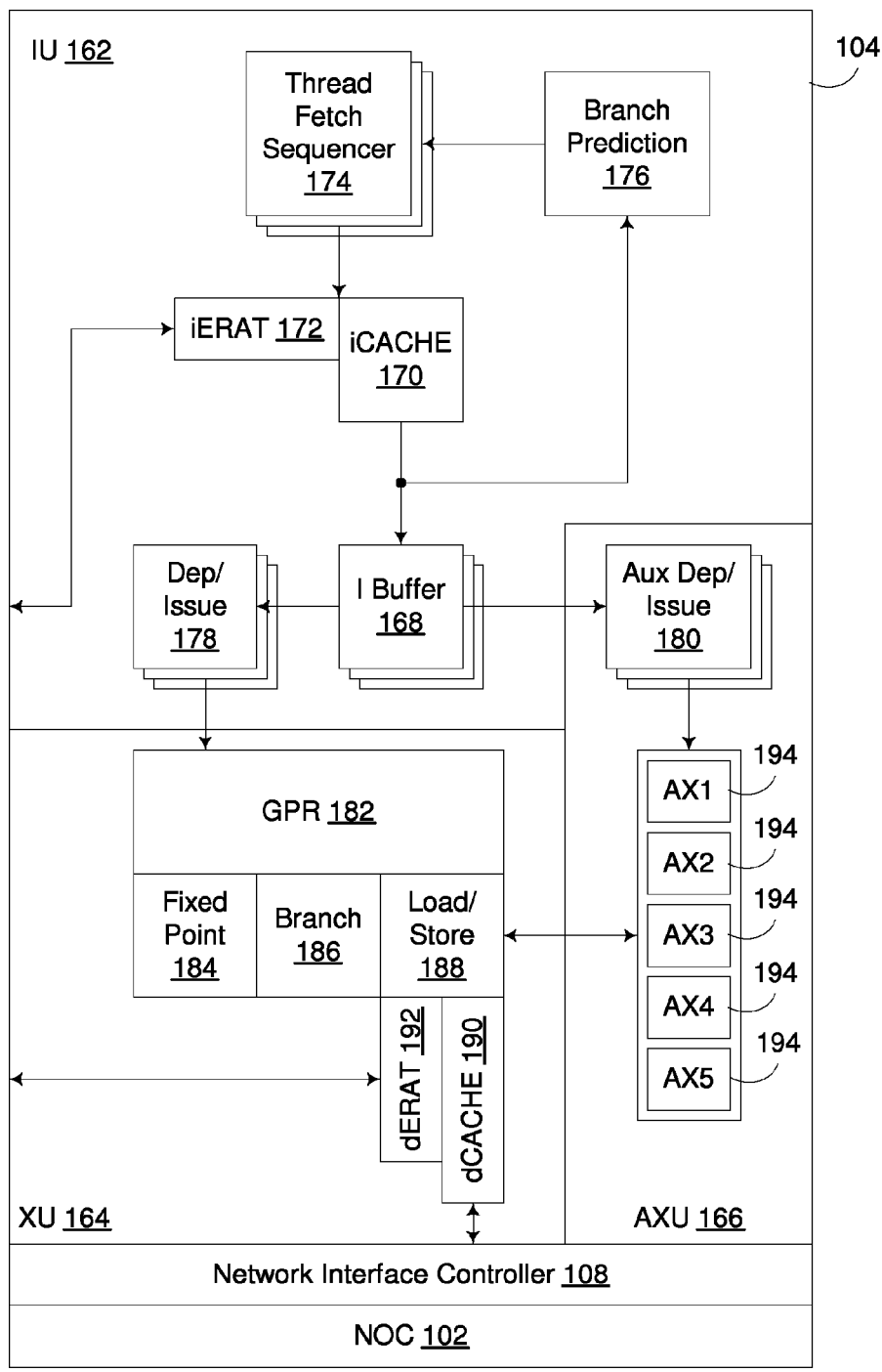
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Processing Unit with Structural Power Reduction

Figure 5:
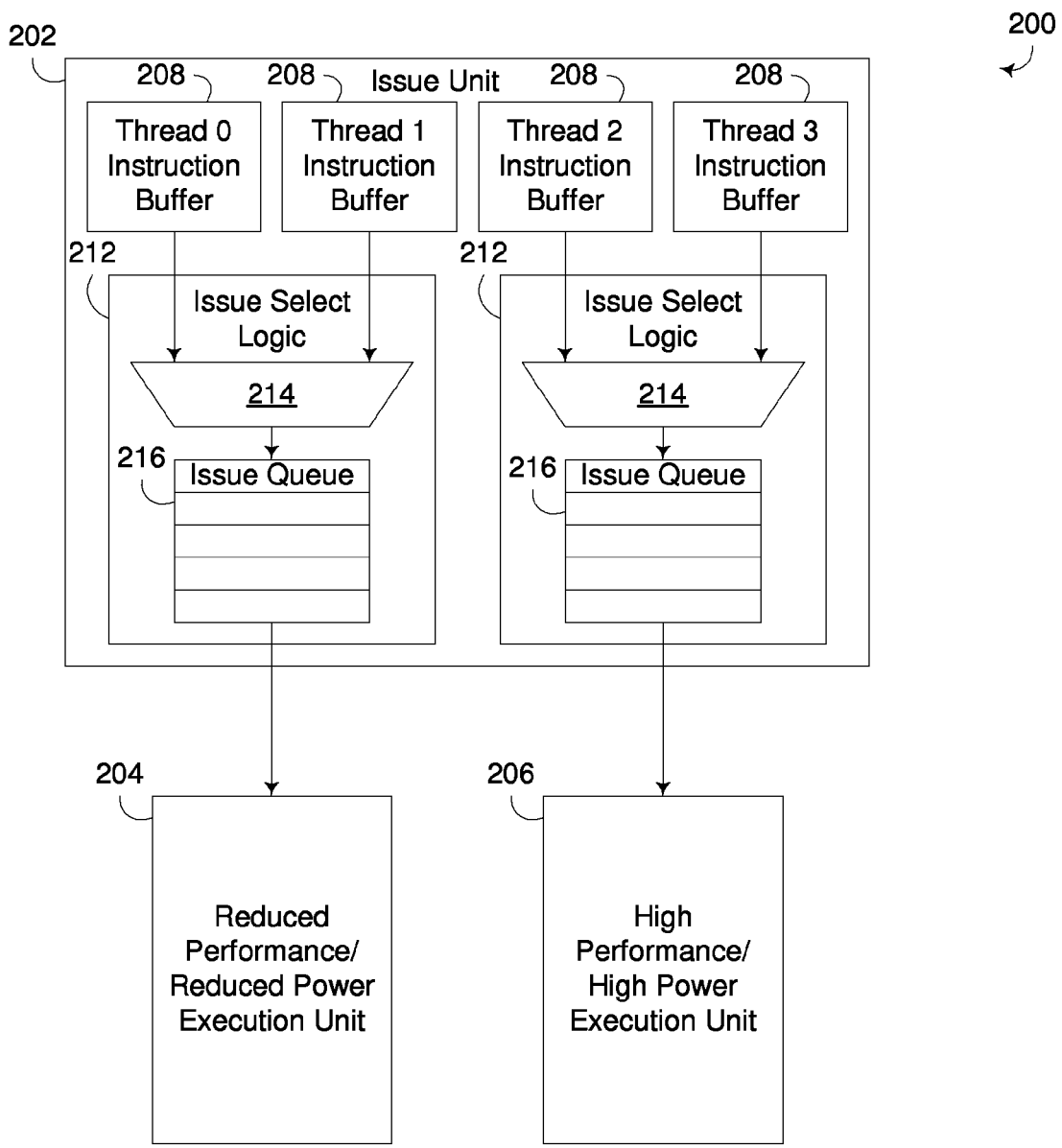
FIG. 5 is a block diagram of a processing unit incorporating structural power reduction consistent with the invention, and capable of being implemented within an IP block from the NOC of FIG. 2.

Turning now to FIG. 5, this figure illustrates an exemplary processing unit 200 incorporating structural power reduction consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Processing unit 200 includes an issue unit 202 coupled to a plurality of (e.g., two) execution units 204, 206. Execution units 204, 206 are functionally equivalent to one another such that, for any instruction supported within an instruction set that is capable of being issued by issue unit 202 to one of execution units 204, 206, that instruction could also be issued to the other execution unit 204, 206 and executed with no difference from a functional standpoint. Each execution unit 204, 206 may be implemented as a number of different types of execution units, e.g., floating point units, fixed point units, or specialized execution units such as graphics processing units, encryption/decryption units, coprocessors, XML processing units, etc., and may be implemented either as vector or scalar-based units.

From a performance and power consumption standpoint, however, execution units 204, 206 provide comparatively different performance and power consumption from one another. In general, for some if not all instructions that that could be executed by either execution unit 204, 206 interchangeably, such instructions will be executed with higher performance (i.e., faster) when executed by execution unit 206, but will consume more power, and generate more heat. Such instructions will execute with less performance, but with less power consumption and heat generation when executed by execution unit 204.

The manner in which execution units 204, 206 may be differently configured to provide different performance and power consumption may vary in different embodiments. Practically any circuit design or fabrication processing technique that can be used to increase/decrease performance and/or increase/decrease power consumption and/or heat generation may be used consistent with the invention. For example, execution units 204, 206 may differ from one another based on one or more performance and/or or power consumption-related characteristics, including but not limited to cycle time, clock frequency, gate capacitance, gate size, operating voltage, circuit area, latch count, number of pipeline stages, pipeline presence (omission or inclusion of pipeline), functional block complexity (e.g., 1-bit divider vs. 8-bit divider), accelerator hardware presence (e.g., omission or inclusion of dedicated multiplier circuit).

Issue unit 202 is a multithreaded issue unit capable of receiving instructions from multiple (e.g. four) hardware threads, which instructions are stored in thread-specific instruction buffers 208. Issue unit 202 functions as multi-threaded routing logic that selectively routes instructions to particular execution units 204, 206 based at least in part on a performance requirement associated with each such instruction. In this implementation, hardware threads are hardwired to a specific execution unit via dedicated issue select logic 212. Thus, in FIG. 5, two threads (labeled thread 0 and thread 1) are statically associated with reduced performance/reduced power execution unit 204, while the other two threads (labeled thread 2 and thread 3) are statically associated with high performance/high power execution unit 206. A multiplexer 214 in each issue select logic 212 schedules the issuance of instructions from instruction buffers 208 by outputting such instructions in a predetermined order into an issue queue 216, and the issue select logic 212 typically includes dependency and arbitration logic to ensure an orderly scheduling of instructions for execution by the appropriate execution unit 204.

It will be appreciated that any number of execution units may be utilized in processing unit 200, and that any number of hardware threads may be associated with each execution unit. Moreover, the issue select logic may be merged together in some implementations. Other modifications will be apparent to one of ordinary skill in the art having the benefit of the instant disclosure.

As noted above, in processing unit 200, hardware threads are statically mapped to or associated with a particular execution unit 202. Thus, in order to associate specific instructions with a specific execution unit, software executed by processing unit 200 is used to map the instructions to a particular hardware thread.

While in some embodiments consistent with the invention, instructions may be specifically associated with different execution units on an instruction by instruction basis, in the illustrated embodiment, instructions are associated with a particular task (which may also be considered analogous to a software thread), and that task in turn is associated with a particular hardware thread, such that when the instructions are ready for execution, they will be routed to the appropriate instruction buffer 208 for the hardware thread for the instructions' associated task.

The manner in which instructions and/or their associated tasks are mapped to a particular execution unit is typically based upon a performance requirement established for such instructions and/or tasks. In addition, the manner in which the performance requirement is determined and used to establish an association of an instruction or task with a particular execution unit may vary in different embodiments. For example, a performance requirement and association may be established during compilation of an application to be executed on processing unit 200, or may be established during runtime of an application executing on processing unit 200. In addition, the determination of a performance requirement and the establishment of an association may be made by an application itself and/or by an operating system and/or kernel executing on the processing unit.

In one embodiment, for example, it may be determined at compile time that a particular task for an application is a background task, and is thus not performance-critical, or is a primary task that is more performance-critical. Then, the task creation code generated by the compiler for inclusion in the application may provide an indication to the operating system as to whether that task is a primary or background task. Then, upon execution of the task creation code by the operating system during runtime, the operating system would know to which execution unit that task should be assigned.

In other embodiments, other manners of determining a performance requirement for an instruction and/or task may be used. For example, an operating system or kernel may dynamically determine the performance requirement of an instruction or task without having to compile an application specifically to provide an indication to the operating system. The operating system can monitor the execution of a task or look at historical task performance metrics. In addition, characteristics of tasks such as task or user priority, task or process type (e.g., a user interface task such as a process waiting for a key or mouse event vs. a background task such as a ray tracing process), etc. may also be used by an operating system to determine the performance requirement for a task. In addition, in some embodiments an external indication of activity or inactivity (e.g., lack of a keyboard or mouse activity) could be used to change a task's performance requirement. The performance requirement may also be specified with just two degrees of granularity, e.g., high/low, or more than two degrees of granularity (e.g., high/medium/low).

Figure 6:
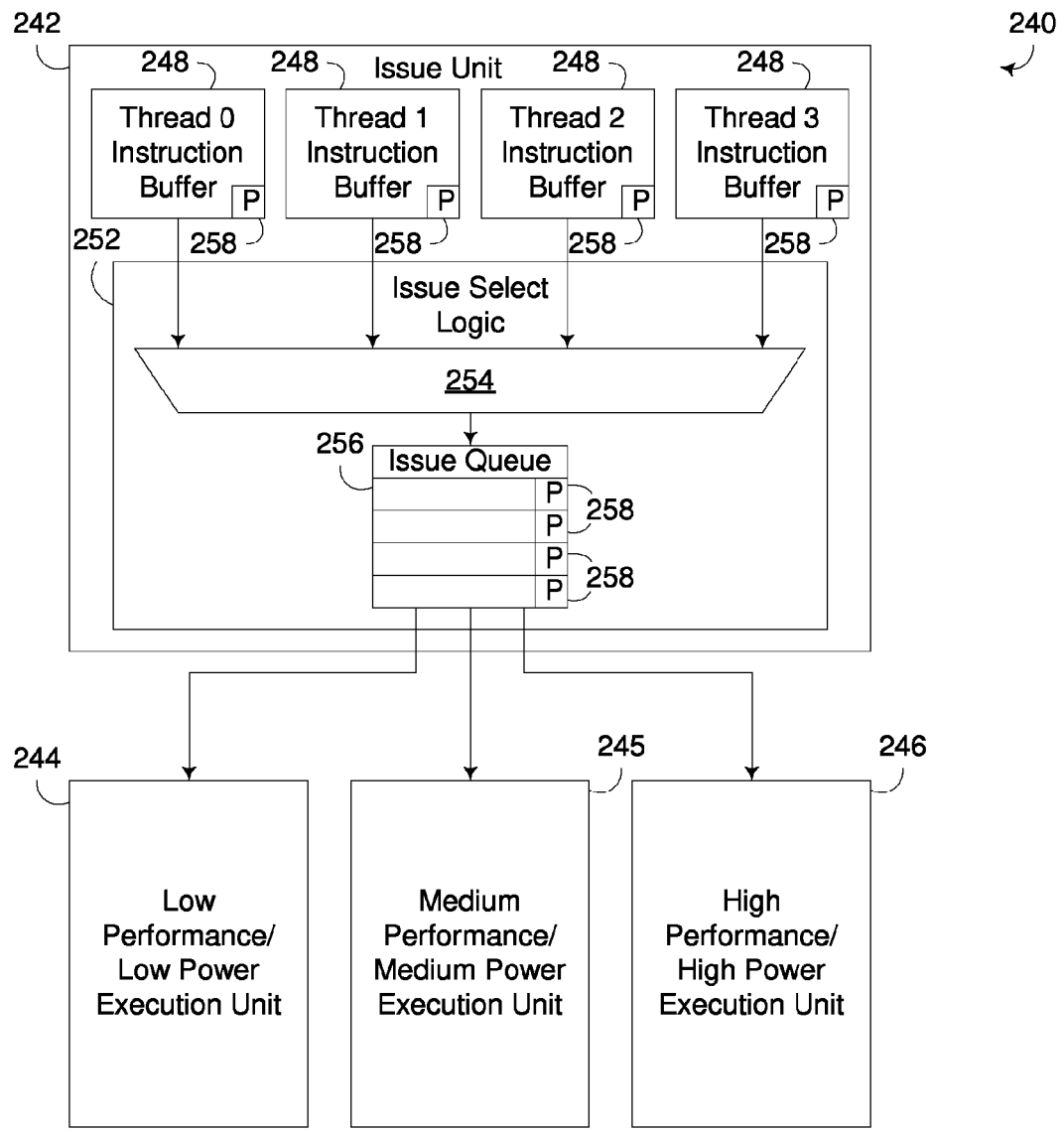
FIG. 6 is a block diagram of an alternate implementation of a processing unit to that of FIG. 5.

FIG. 6 illustrates another implementation of a processing unit 240 suitable for implementing structural power reduction consistent with the invention. In this implementation, a multithreaded issue unit 242 is coupled to three execution units 244, 245, 246, which respectively represent execution units configured with low, medium and high performance and power consumption characteristics. Processing unit 240 also supports four hardware threads, with each hardware thread having an associated dedicated instruction buffer 248 into which an operating system places instructions scheduled for execution by the associated hardware thread. Unlike processing unit 200, however, processing unit 240 includes issue select logic 252, which that is coupled to all four instruction buffers 248, and which incorporates a single multiplexer 254 feeding a single issue queue 256 to handle the scheduling of instructions for execution by execution units 244, 245 and 246.

Thus, a single issue queue is shared by all hardware threads, and the issue unit routes instructions out of the issue queue to the appropriate execution unit based upon the performance requirement of each such instruction. While various alternate manners of routing instructions based upon the performance requirement thereof may be used, in processing unit 240, each instruction is provided with a performance "P" tag 258 that is used by the routing logic in the issue unit to determine to which execution unit 244, 245, 246 the instruction should be routed. The P tag 258 may be implemented using a single bit if no more than two execution units are supported, or if more are supported, a multi-bit tag may be used. In the embodiment shown in FIG. 6, a P bit 258 is included within each hardware thread instruction buffer 248, so that when a software task is allocated to a thread, it sets the P tag based upon the performance requirement of that task. The P tag accompanies the thread's instructions through the issue queue and directs the instructions to the appropriate execution unit. Other manners of notifying the issue unit of the performance requirement of a task and/or instruction so that the issue unit is capable of routing instructions from the issue queue to the appropriate execution unit will be apparent to one of ordinary skill in the art having the benefit of the instant disclosure.

Figure 7:
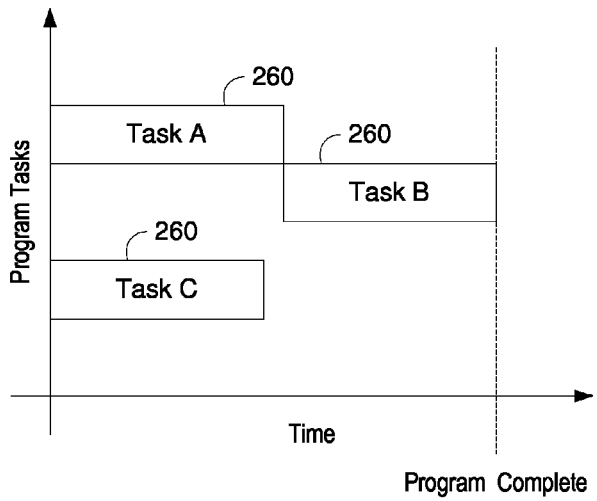
FIG. 7 is a timing diagram illustrating the progress of multiple tasks in a software program executed by the processing unit of FIG. 5, illustrating timing criticality of the tasks in the program.

Now turning to FIG. 7, this figure illustrates the execution of multiple tasks 260 in an exemplary software application, with the tasks additionally labeled tasks A, B and C. In this example, task B is dependent upon results from task A, and thus cannot be executed until completion of task A. Task C, however, is independent of tasks A & B. For example, tasks A and B may be primary tasks and task C may be a background task. Assume that all three tasks need to complete in order for the program to complete its work. However, since task B is dependent upon task A, the program cannot complete until both tasks are complete. Task C, however, can begin at the same time as task A, but, if given equal resources, will complete before tasks A and B complete. As a result, overall program performance is determined by tasks A and B, and task C is not performance-critical. Consequently, were these tasks executed in either processing unit 200 or processing unit 240, were task C assigned to a low power/low performance execution unit and tasks A and B assigned to a high power/high performance execution unit, the fact that task C was executed with lower performance would not impact the overall completion time for the application program, but would consume less power and generate less heat.

Figures 8, 9, 10:
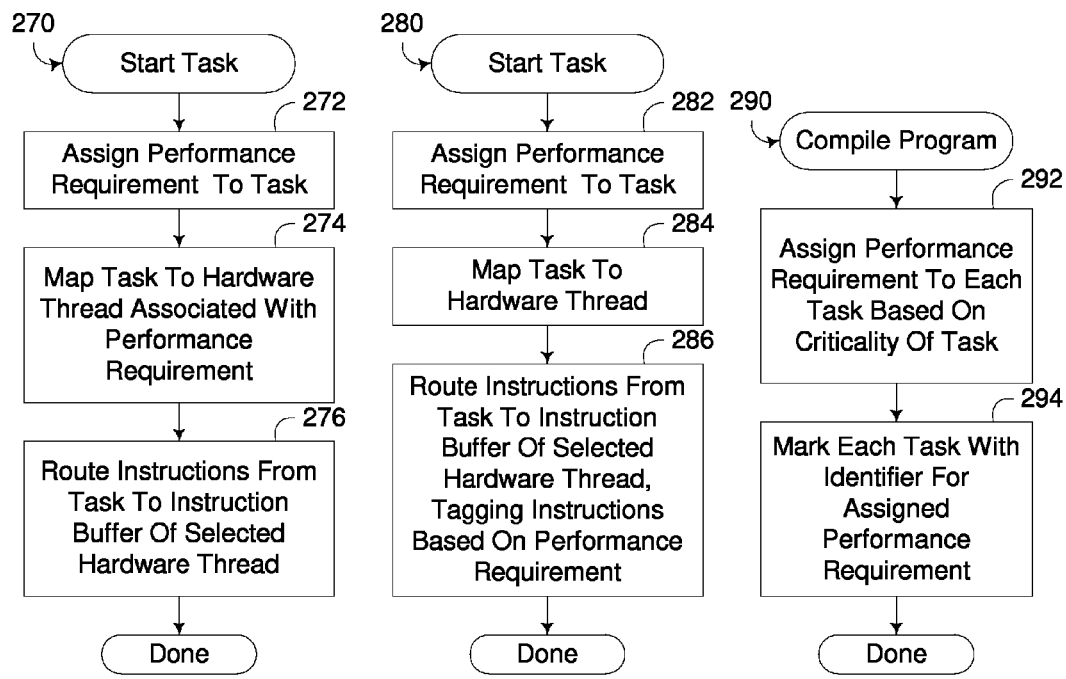
FIG. 8 is a flowchart illustrating an exemplary implementation of a routine for executing a task in the processing unit of FIG. 5.
FIG. 9 is a flowchart illustrating an exemplary implementation of a routine for executing a task in the processing unit of FIG. 6.
FIG. 10 is a flowchart illustrating an exemplary implementation of a compilation routine for assigning a performance requirement to tasks in a software program application prior to execution of such program by the processing units of either of FIGS. 5 and 6.

FIG. 8 next illustrates a flowchart of an exemplary routine 270 for executing a task in processing unit 200 of FIG. 5. In this routine, in association with creating/initializing the task, a performance requirement is assigned to that task in block 272, e.g., by the parent application of the task, or by an operating system or kernel executing on processing unit 200. Once the performance requirement for the task is assigned, the task is mapped to a hardware thread associated with the assigned performance requirement for the task in block 274, which is typically performed by an operating system or kernel. Once the task is mapped to the appropriate hardware thread, instructions associated with that task are then routed to the instruction buffer 208 associated with the assigned hardware thread, so that all instructions from the task are handled by the execution unit 204, 206 assigned to the hardware thread.

FIG. 9 next illustrates a flowchart of an exemplary routine 280 for executing a task in processing unit 240 of FIG. 6. In this routine, in association with creating/initializing the task, a performance requirement is assigned to that task in block 282, e.g., by the parent application of the task, or by an operating system or kernel executing on processing unit 240. Once the performance requirement for the task is assigned, the task is mapped to a hardware thread in block 284, which is typically performed by an operating system or kernel. Of note, in this embodiment the hardware thread to which a task is assigned may not necessarily be dedicated to handling tasks associated with a particular performance requirement. However, instructions associated with the task are tagged with performance tags that identify the performance requirement for such instructions. As such, in block 286, instructions from the task are routed to the instruction buffer of the selected hardware thread, and are tagged with performance tags such that, once the instructions are placed on the shared issue queue 252, they will be routed to the appropriate execution unit 244, 245, 246 based on the value of the associated performance tags.

As noted above, the establishment of a performance requirement for an instruction or task may be performed at runtime, or alternatively during compilation of an application program. FIG. 10, for example, illustrates a compile program routine 290 executed during compilation of an application program. Other steps in the compilation of the application program are not relevant to an understanding of the invention, and have been omitted for clarity. Routine 290 begins in step 292 by assigning a performance requirement to each task in the application program based on the performance criticality of the task, e.g., whether the task is a primary or background task. Next, block 294 marks each task with an identifier for the assigned performance requirement, e.g., by generating task creation code in the executable program code for the application that sets an appropriate flag during task creation to identify the performance requirement of a task to the operating system or kernel when creation of the task is requested by the application.

Thus, in contrast with conventional designs that might incorporate multiple identical execution units capable of operating in parallel, but all configured to meet a maximum performance requirement, embodiments consistent with the invention implement one or more execution units having reduced performance and power consumption characteristics so that if a particular software task is not performance critical, it can be allocated to a hardware thread that uses a lower power/lower performance execution unit to decrease power consumption of the processing unit when executing that thread, but with little or no effect on overall performance.

It will be appreciated that a wide variety of alternate designs may be used to route instructions to different execution units based on performance requirements without departing from the spirit and scope of the invention. For example, the performance requirement of a task may be changed dynamically, so that a task that was originally designated as a high performance task could be changed to a low performance task during runtime if it is determined that little or no performance loss would result from decreasing the performance of that task. Other modifications may also be made without departing from the spirit and scope of the invention. Therefore, the invention lies in the claims hereinafter appended.

What is claimed is:

1. A circuit arrangement, comprising:
a high power/high performance execution unit configured to execute instructions from an instruction set;
a reduced power/reduced performance execution unit configured to execute instructions from the instruction set, wherein the reduced power/reduced performance execution unit has a lower power consumption and lower performance relative to the high power/high performance execution unit and is functionally equivalent to the high power/high performance execution unit such that instructions from the instruction set are interchangeably executable by either of the reduced power/reduced performance and high power/high performance execution units;
a first instruction buffer associated with a first hardware thread, the first instruction buffer configured to receive instructions associated with a first task having a higher performance requirement;
a second instruction buffer associated with a second hardware thread, the second instruction buffer configured to receive instructions associated with a second task having a lower performance requirement;
at least one issue queue;
multithreaded routing logic coupled to the reduced power/reduced performance and high power/high performance execution units and configured to route instructions stored in the first and second instruction buffers to the reduced power/reduced performance and high power/high performance execution units for execution thereby, the multithreaded routing logic configured to route instructions associated with the first task to the high power/high performance execution unit via the at least one issue queue based upon the higher performance requirement for the first task, and to route instructions associated with the second task to the reduced power/reduced performance execution unit via the at least one issue queue based upon the lower performance requirement for the second task.

2. A circuit arrangement, comprising:
a plurality of execution units, each of which configured to execute instructions from among a common set of instruction formats defined in an instruction set, wherein the plurality of execution units includes a first execution unit having lower performance and lower power consumption relative to a second execution unit from among the plurality of execution units; and
multithreaded routing logic coupled to the plurality of execution units and configured to route instructions from a plurality of hardware threads to the plurality of execution units for execution thereby, the multithreaded routing logic configured to route a first instruction to the first execution unit based upon a lower performance requirement associated with the first instruction, and to route a second instruction to the second execution unit based upon a higher performance requirement associated with the second instruction relative to that of the first instruction,
wherein the multithreaded routing logic is disposed in a multithreaded issue unit that is common to the plurality of execution units, and wherein the multithreaded issue unit and the plurality of execution units are disposed in a common processor core.

3. The circuit arrangement of claim 2, wherein the first and second execution units are functionally equivalent to one another such that each instruction from among the common set of instruction formats is executable by either of the first and second execution units.

4. The circuit arrangement of claim 3, wherein the first and second execution units differ from one another based upon at least one characteristic associated with power consumption, the at least one characteristic selected from a group consisting of cycle time, clock frequency, gate capacitance, gate size, operating voltage, circuit area, latch count, number of pipeline stages, pipeline presence, functional block complexity, accelerator hardware presence, and combinations thereof.

5. The circuit arrangement of claim 2, further comprising a third execution unit configured to execute instructions from among the common set of instruction formats defined in the instruction set, the third execution unit having different performance and power consumption relative to the first and second execution units, and wherein the multithreaded routing logic is configured to route instructions based upon at least first, second and third performance requirements respectively associated with the first, second and third execution units.

6. The circuit arrangement of claim 2, wherein the multithreaded routing logic includes a plurality of issue queues, the plurality of issue queues including a first issue queue associated with the first execution unit and a second issue queue associated with the second execution unit, and wherein the multithreaded routing logic is configured to route instructions to the first and second execution units by forwarding such instructions to the first and second issue queues.

7. The circuit arrangement of claim 6, wherein the first issue queue is associated with a first hardware thread among the plurality of hardware threads, and wherein the second issue queue is associated with a second hardware thread among the plurality of hardware threads.

8. The circuit arrangement of claim 7, wherein the first hardware thread is associated with a first instruction buffer, wherein the second hardware thread is associated with a second instruction buffer, wherein the multithreaded routing logic is configured to route instructions stored in the first instruction buffer to the first issue queue and to route instructions stored in the second instruction buffer to the second issue queue, and wherein instructions from an application are selectively routed to at least one of the first and second instruction buffers via software.

9. The circuit arrangement of claim 2, wherein the first execution unit is associated with a first hardware thread among the plurality of hardware threads, and wherein the second execution unit is associated with a second hardware thread among the plurality of hardware threads.

10. The circuit arrangement of claim 9, wherein the first and second execution units and the multithreaded routing logic are disposed in a processor core, wherein the first instruction is associated with a first task and the second instruction is associated with a second task, wherein the first task is associated with the first hardware thread and the second task is associated with the second hardware thread, and wherein the association of the first and second tasks with the first and second hardware threads is established via software.

11. The circuit arrangement of claim 10, wherein the association of the first and second tasks with the first and second hardware threads is established during compilation of an application program configured for execution on the processor core.

12. The circuit arrangement of claim 10, wherein the association of the first and second tasks with the first and second hardware threads is established during execution of an application on the processor core.

13. The circuit arrangement of claim 12, wherein the association of the first and second tasks with the first and second hardware threads is established during runtime by at least one of the application, an operating system or a kernel executing on the processor core.

14. The circuit arrangement of claim 10, wherein the first task is a background task and the second task is a primary task, and wherein the multithreaded routing logic is configured to route instructions associated with the background task to the first execution unit and route instructions associated with the primary task to the second execution unit.

15. The circuit arrangement of claim 2, wherein the multithreaded routing logic includes an issue queue associated with the every execution unit from among the plurality of execution units, wherein the multithreaded routing logic is configured to route instructions to the first and second execution units by forwarding such instructions from the issue queue.

16. The circuit arrangement of claim 2, wherein the performance requirement of each instruction is based upon a performance requirement of a task within which the instruction is executed.

17. An integrated circuit device including the circuit arrangement of claim 2.

18. A program product comprising a computer readable recordable medium and logic definition program code resident on the computer readable medium and defining the circuit arrangement of claim 2.

19. A circuit arrangement, comprising:
a plurality of execution units, each of which configured to execute instructions from among a common set of instruction formats defined in an instruction set, wherein the plurality of execution units includes a first execution unit having lower performance and lower power consumption relative to a second execution unit from among the plurality of execution units; and multithreaded routing logic coupled to the plurality of execution units and configured to route instructions from a plurality of hardware threads to the plurality of execution units for execution thereby, the multithreaded routing logic configured to route a first instruction to the first execution unit based upon a lower performance requirement associated with the first instruction, and to route a second instruction to the second execution unit based upon a higher performance requirement associated with the second instruction relative to that of the first instruction, wherein the multithreaded routing logic includes an issue queue associated with the every execution unit from among the plurality of execution units, wherein the multithreaded routing logic is configured to route instructions to the first and second execution units by forwarding such instructions from the issue queue, wherein the first hardware thread is associated with a first instruction buffer, wherein the second hardware thread is associated with a second instruction buffer, and wherein the multithreaded routing logic is configured to route instructions stored in the first and second instruction buffers to the issue queue.

20. The circuit arrangement of claim 19, wherein instructions from an application are selectively tagged via software based upon performance requirements associated therewith, and wherein the multithreaded routing logic is configured to route instructions stored in the issue queue to one of the first and second execution units based upon tags associated with such instructions.

21. A method of executing instructions associated with a plurality of hardware threads in a multithreaded processor core of the type having a plurality of execution units, the method comprising:
routing a first instruction associated with a lower performance requirement to a first execution unit among the plurality of execution units in the multithreaded processor core using a multithreaded issue unit coupled to the plurality of execution units based upon the lower performance requirement for the first instruction, wherein each execution unit among the plurality of execution units is configured to execute instructions from among a common set of instruction formats defined in an instruction set, and wherein the first execution unit has lower performance and lower power consumption relative to a second execution unit from among the plurality of execution units; and
routing a second instruction associated with a higher performance requirement relative to that of the first instruction to the second execution unit in the multithreaded processor core using the multithreaded issue unit based upon the higher performance requirement for the second instruction, wherein the multithreaded processor core is common to the plurality of execution units and the multithreaded issue unit, and wherein the multithreaded issue unit is common to the plurality of execution units.

22. The method of claim 21, wherein the multithreaded processor core includes a plurality of issue queues, the plurality of issue queues including a first issue queue associated with the first execution unit and a second issue queue associated with the second execution unit, wherein the first issue queue is associated with a first hardware thread among the plurality of hardware threads, and wherein the second issue queue is associated with a second hardware thread among the plurality of hardware threads, and wherein routing the first instruction to the first execution unit includes forwarding the first instruction to the first issue queue, and routing the second instruction to the second execution unit includes forwarding the second instruction to the second issue queue.

23. The method of claim 22, wherein the multithreaded processor core includes an issue queue associated with the every execution unit from among the plurality of execution units, wherein routing the first instruction to the first execution unit includes forwarding the first instruction from the issue queue to the first execution unit, and routing the second instruction to the second execution unit includes forwarding the second instruction from the issue queue to the second execution unit.

24. The method of claim 21, wherein the performance requirement of each instruction is based upon a performance requirement of a task within which the instruction is executed.

* * * * *